United States Patent [19]

Lilja et al.

[11] Patent Number: 5,542,361
[45] Date of Patent: Aug. 6, 1996

[54] METHOD FOR ADJUSTING THE SUPPLY OF A REACTION GAS TO BE FED INTO A SMELTING FURNACE, AND A MULTIPURPOSE BURNER DESIGNED FOR REALIZING THE SAME

[75] Inventors: Launo L. Lilja; Valto J. Mäkitalo, both of Pori, Finland

[73] Assignee: Outokumpu Research Oy, Pori, Finland

[21] Appl. No.: 311,112

[22] Filed: Sep. 23, 1994

Related U.S. Application Data

[62] Division of Ser. No. 68,745, May 28, 1993, Pat. No. 5,370,369.

[30] Foreign Application Priority Data

Jun. 1, 1992 [FI] Finland .................. 922531

[51] Int. Cl.$^6$ .................. F23D 1/00; F23C 1/10; F23K 3/02
[52] U.S. Cl. .................. 110/341; 110/348; 110/261; 110/265; 110/104 B
[58] Field of Search .................. 110/309, 310, 110/311, 313, 300, 261, 262, 265, 104 B, 347, 348

[56] References Cited

U.S. PATENT DOCUMENTS

| | | | |
|---|---|---|---|
| 3,989,443 | 11/1976 | Campbell | 431/8 |
| 4,490,170 | 12/1984 | Lilja et al. | 75/26 |
| 4,630,554 | 12/1986 | Sayler et al. | 110/261 |
| 4,928,605 | 5/1990 | Suwa et al. | 110/261 |
| 5,347,937 | 9/1994 | Vatsky | 110/261 |

*Primary Examiner*—Henry A. Bennett
*Assistant Examiner*—Susanne C. Tinker
*Attorney, Agent, or Firm*—Brooks Haidt Haffner & Delahunty

[57] ABSTRACT

The invention relates to a method for feeding a reaction gas, such as oxygen or oxygen-enriched air to a flash smelting furnace through a concentrate burner, so that the gas is fed in around a pulverous material distribution channel located in the middle of the burner. Oxygen or oxygen-enriched air is fed into the reaction shaft through tubular channels in several separate gas jets, and the discharge velocity of the gas jets is adjusted. The invention also relates to an apparatus for feeding reaction gas through a concentrate burner to a flash smelting furnace (4), wherein the reaction gas is fed in around a pulverous material distribution channel (3) located in the middle of the concentrate burner, in which channel there is formed an annular burner chamber (8) inside which the reaction gas is made to flow into the reaction shaft (5) essentially through gas distribution tubes (9) parallel to the vertical axis of the reaction shaft, at least at their bottom end, so that at the top end of the gas distribution tubes there is installed an adjusting member (10) adjusting the discharge velocity of the reaction gas.

6 Claims, 6 Drawing Sheets

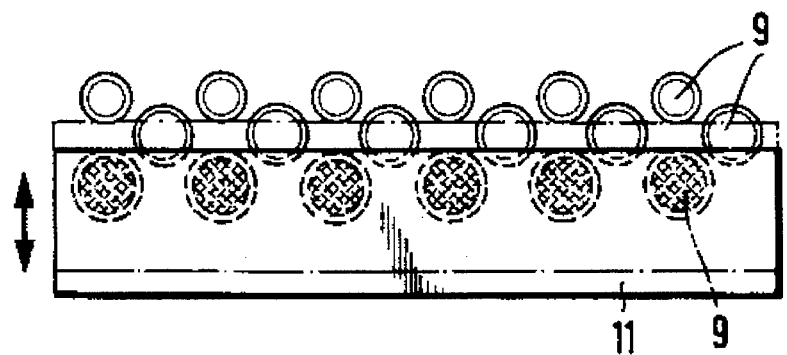
Fig.5A
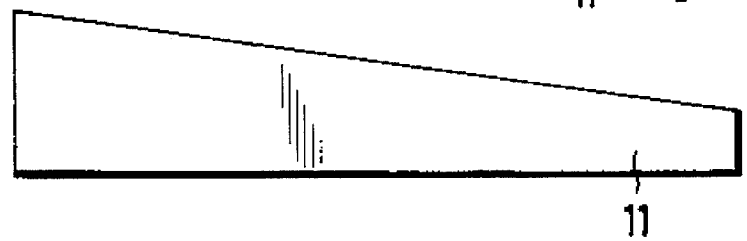
Fig.5B
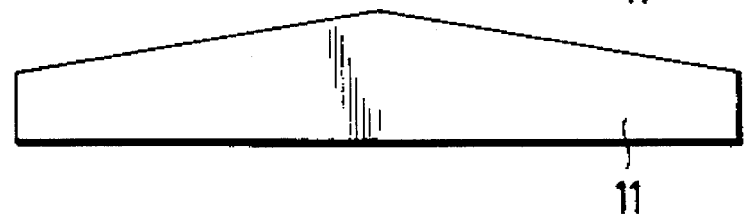
Fig.5C
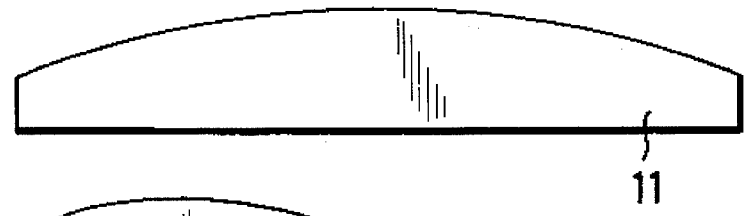
Fig.5D
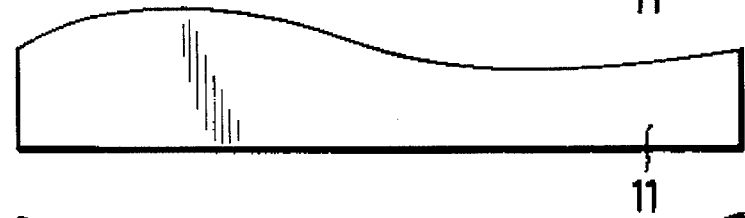
Fig.5E
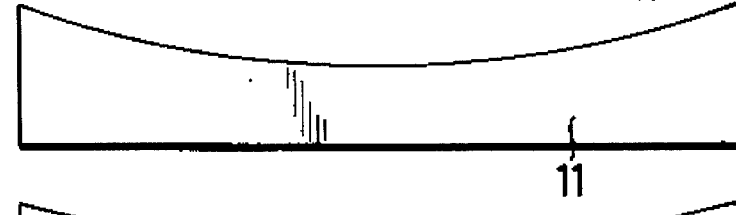
Fig.5F
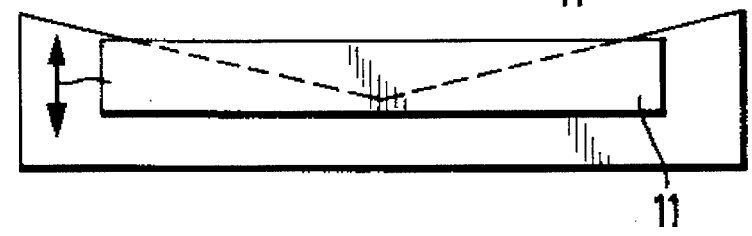
Fig.5G
Fig.5

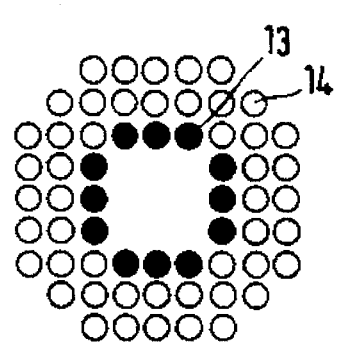
Fig. 6A
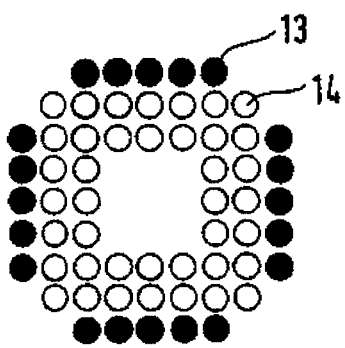
Fig. 6B
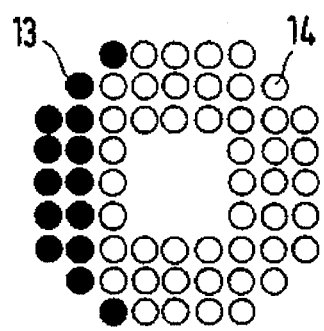
Fig. 6C
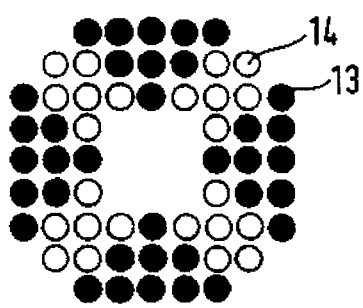
Fig. 6D
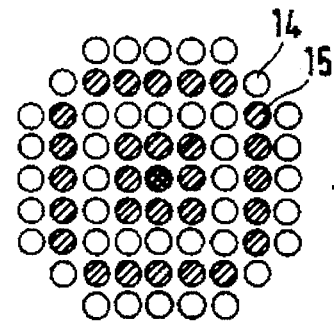
Fig. 6E
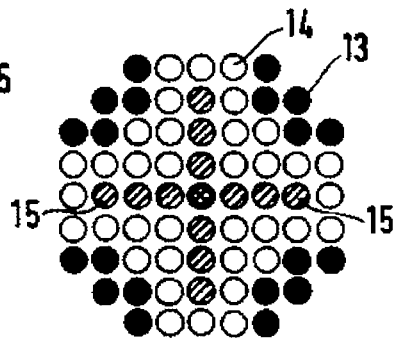
Fig. 6F
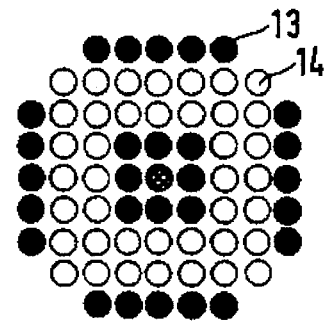
Fig. 6G
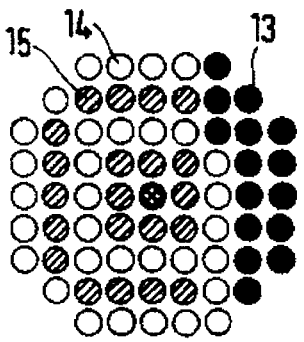
Fig. 6H
Fig. 6

METHOD FOR ADJUSTING THE SUPPLY OF A REACTION GAS TO BE FED INTO A SMELTING FURNACE, AND A MULTIPURPOSE BURNER DESIGNED FOR REALIZING THE SAME

This application is a division of application Ser. No. 08/068,745, filed May 28, 1993 now U.S. Pat. No. 5,510,369.

BACKGROUND OF THE INVENTION

The invention relates to a method for feeding reaction gas such as oxygen-enriched gas meant for oxidizing the pulverous fuel of a furnace, advantageously a flash smelting furnace, and a possible gaseous extra fuel into the furnace and to adjusting the supply in a concentrate burner. The invention is also related to an apparatus designed for realizing the adjusting, i.e. a multipurpose burner.

DESCRIPTION OF THE PRIOR ART

The pulverous material itself can be easily dispersed and distributed in the reaction shaft of the furnace in a desired fashion, for instance by means of a central jet distributor which is described in the GB patent 1,569,813.

The turning of oxygen or oxygen-enriched gas such as air from mainly horizontal plane to vertical plane, which is necessary for a vertical reaction shaft for instance in a flash smelting furnace, and the directing thereof to be parallel to the vertical reaction shaft, can also be realized with a directional burner, which is described for instance in the U.S. Pat. No. 4,392,885.

In a normal case, i.e. in a case where air or partially oxygen-enriched air is used, and the fluctuations of capacity are not large, this burner with a stationary aperture is sufficient, but because the tendency nowadays is to use technical grade oxygen of nearly 100%, the gas amounts in the burner are decreased, relatively speaking, down to a fifth. Now the reaching of a certain velocity for the burner gas requires an increasingly small cross-sectional area of flow for the supply orifice of the burner.

Because the orifice most often is annular in shape, the orifice aperture easily becomes small, and even a minor asymmetry in the installation causes the gas flow to pull on one side of the reaction shaft and leads to irregular burning. Reaction gas in this application means oxygen or oxygen-enriched air.

The situation is made even more difficult by the use of an oxygen lance inside the central jet distributor, according to for instance the U.S. Pat. No. 5,133,801, because the oxygen lance enlarges the central jet distributor, which again enlarges the inner diameter of the annular orifice of the reaction gas discharge when using a directional burner, and thus further restricts the discharge aperture itself.

Our U.S. Pat. No. 4,490,170 describes a method where the annular orifice is replaced by several pipes, in which case the harmful asymmetry of the annular orifice, owing to a shift of the central pipe, cannot take place.

A fairly common requirement for the burner is that it must be able to operate in a wide range of capacity and oxygen enrichment. Thus, when using a burner with a fixed aperture, the discharge velocities of the reaction gas fall outside the acceptable range, i.e. an adjustable cross-sectional area is required for the aperture.

The adjusting of the reaction gas introduced in the U.S. Pat. No. 4,331,087 relates to the adjusting of the circulation, and consequently a linear gas velocity mainly parallel to the reaction shaft cannot be adjusted thereby.

SUMMARY OF THE INVENTION

The method and apparatus for adjusting the supply of oxygen and oxygen-enriched air according to the present invention is particularly well applied to the above described concentrate burners, particularly to the concentrate burners of a flash smelting furnace.

According to the invention, the reaction gas flowing from the inlet channel to the combustion chamber is distributed, with the aid of the pressure difference and, when necessary, guide vanes, to the whole area of the adjusting assembly. The adjusting member/members open a suitable number of tubular channels at the required spot, and the pressure difference between the burner chamber and the reaction space forces the process air to the reaction space, distributed in a fashion determined by the adjustment of the adjusting device.

The shifting motion of the adjusting member is transversal with respect to the central axis of the burner chamber-side end of the channels. It can open or close flow apertures to the channels, principally starting from the furnace-side or opposite edge of the channel openings. In this fashion, in the case of a partial load the strength of the gas jet flowed into the furnace can be made stronger either near the central axis or farther away of it. Process conditions determine which manner is more advantageous to apply.

The desired velocity of discharge and distribution around the pulverous concentrate flow even with remarkable fluctuations of capacity and oxygen percentage is in our invention obtained with a number of mainly parallel tubes of the desired size, whereto either one or several gases can be conducted, and which suitably encircle the fuel. For adjustment purposes, the tubes can be closed either completely or partially.

The adjusting idea must be sufficiently simple and secure in operation, considering the severe circumstances prevailing in the reaction shaft: high temperature, possible formation of buildups etc.

In all simplicity, the apparatus of the invention is as follows:

adjustment with a uniform adjusting member adjustment by cutting the adjusting member into separately adjustable parts a system adjusted according to the passing of time, which sequentially arranges a predetermined flow situation on different sides of the burner structures made of simple standard materials which endure high temperatures, too a simple, compact structure (use of oxygen)

observation and cleaning conduits are easily provided the structure of the adjusting assembly can be made so compact, that it also serves as a closing valve if a less compact structure is used, there is arranged an automatic cooling for those parts that are exposed to furnace radiation by using two or more burner chambers, for instance air and oxygen can be driven to the reaction space along separate, individual channels, and an effective mixing can still be achieved in the reaction space proper the apparatus can be used either with or without a distributor.

BRIEF DESCRIPTION OF THE DRAWINGS

The adjusting methods of the invention are explained in more detail with reference to the appended drawings, where FIG. 6 illustrates eight different possibilities for adjusting the tubeworks (closing/different gases).

DETAILED DESCRIPTION OF PREFERRED EMBODIMENTS

Figure 1:
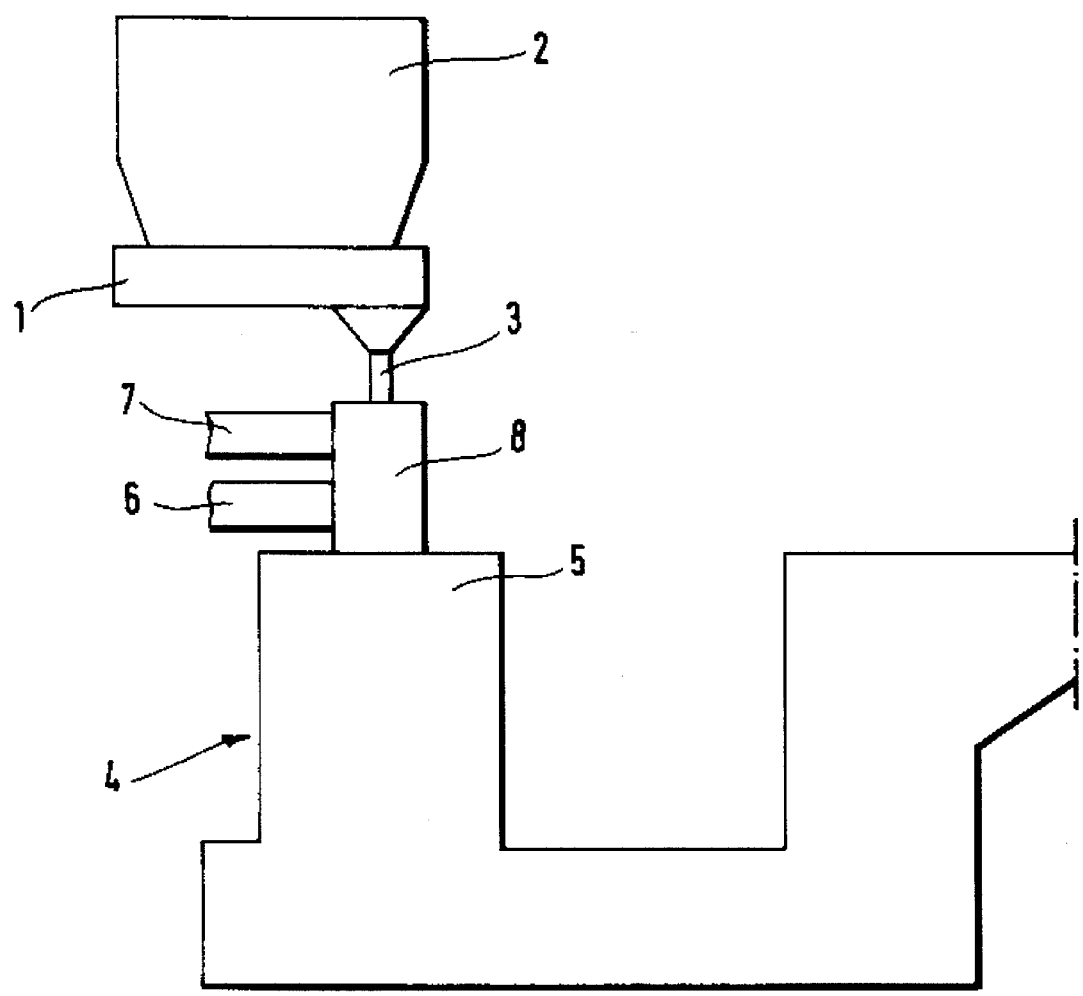
FIG. 1 is a schematical illustration of a preferred embodiment of the invention, i.e. a flash smelting furnace.

The reference number 1 in FIG. 1 denotes a conveyor whereby a pulverous material such as a concentrate is conveyed from a tank 2 to the top part of a distribution channel 3, so that the material falls as a continuous flow through the said channel 3 to the top part 5 of the reaction shaft of a flash smelting furnace 4. The reaction gas and a possible extra gas are conducted, via the pipes 6 and 7, to a burner chamber 8, wherethrough the gases are discharged, from around the said distribution channel 3, to the top part 5 of the reaction shaft, in parallel direction thereto.

Figure 2:
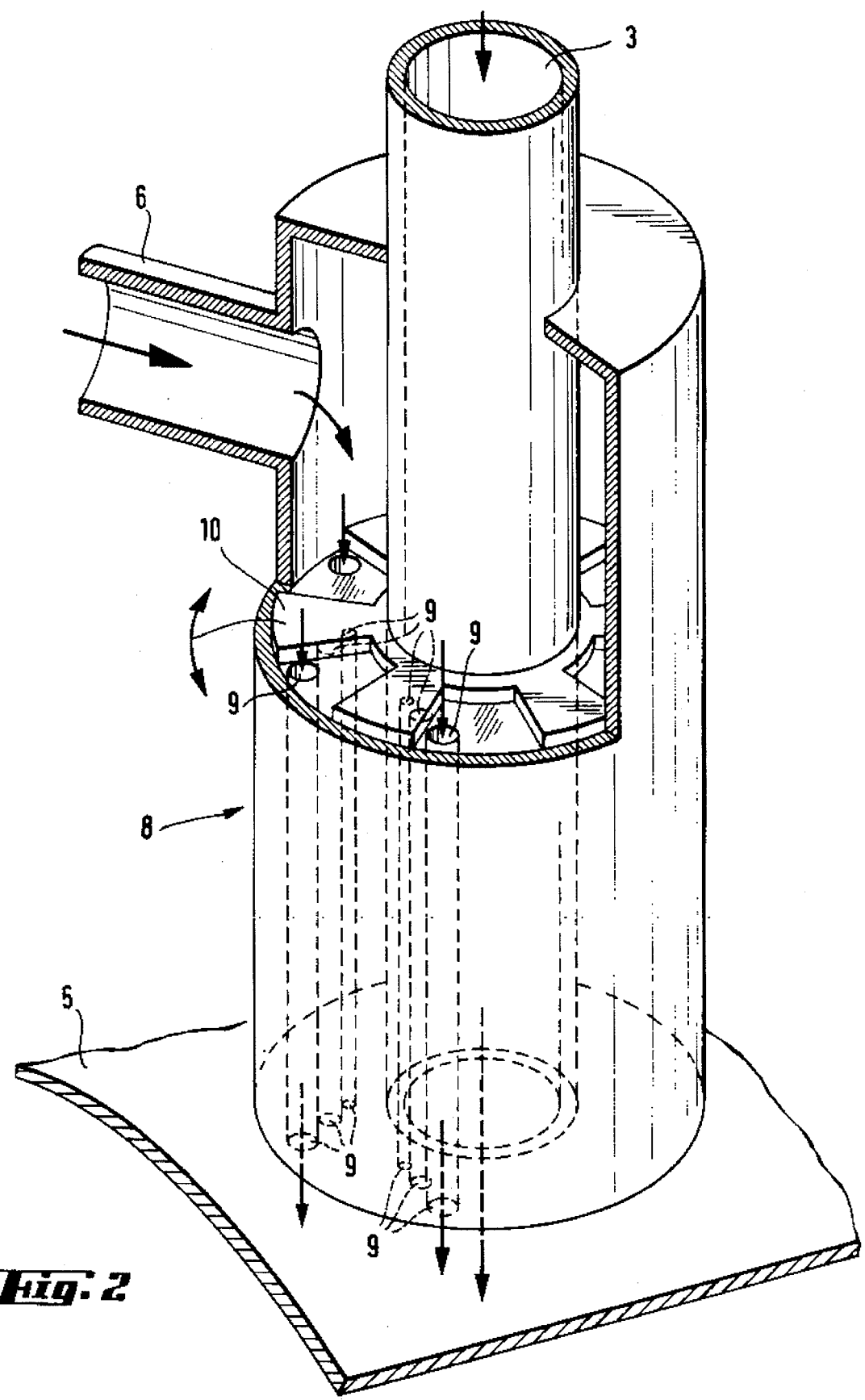
FIG. 2 illustrates a preferred embodiment of the invention arranged around a supply channel (distributor) of a pulverous substance, for instance concentrate.

FIG. 2 illustrates a situation where a gaseous extra fuel is not used. The reaction gas, such as oxygen or oxygen-enriched air is in most cases directed first nearly horizontally and then turned, by utilizing the burner chamber 8 of the present invention, parallelly to the central axis of the reaction shaft, to the top part of the shaft. According to FIG. 2 the gas distribution is based on a large L/D (length/diameter) proportion of the distribution tubes 9 and on a good dirigibility of the gas.

The conducting of the reaction gas into the said reaction space is carried out, according to the present invention, through separate tubes 9 with possibly different diameters, so that the smaller tubes are nearer to and larger tubes farther from the concentrate flow (the impulse principle). The tubes 9 encircle the distribution channel 3 in a grate-like fashion, in a normal case symmetrically, as is illustrated for instance in FIGS. 3A, 3B, 3C and 3D.

The discharge velocity of the reaction gas into the furnace is adjusted by an essentially horizontally arranged adjusting member 10 of the invention, which is installed inside the burner chamber 8 and encircles the distribution channel 3 of the pulverous material. The adjusting member 10 is adjusted so that the reaction gas is mixed in separate jets with optimum energy and velocity to the distributed and advantageously sideways spread flow of pulverous material. The flow of the said material can be formed by employing for example a central jet distributor.

FIG. 3 is a more detailed top-view illustration of an adjusting member 10 of the invention and three different adjusting situations. FIG. 3A represents the adjusting member 10 proper, which can be turned horizontally to cover the gas tubes 9 in a desired, controlled fashion. The diameter of the adjusting member 10 is equal to the burner chamber 8 in size and shape, and, as is seen in FIG. 3A, it is made of an annular plate so that sector-like openings are cut off it, and sector-like brackets are left in the plate. The number of the brackets is advantageously 3–8.

Figure 3A:
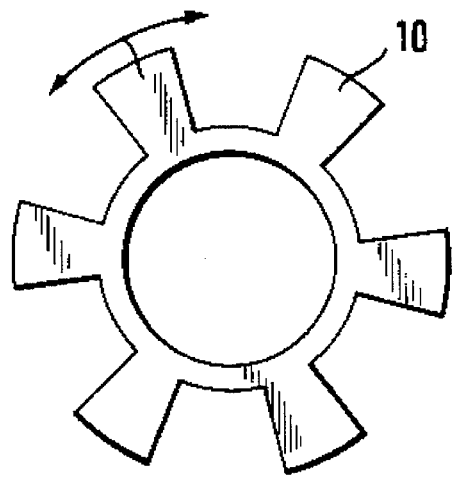
FIG. 3 illustrates the turnable member of the adjusting member of FIG. 2, and three examples of its adjusting possibilities.
Figure 3B:
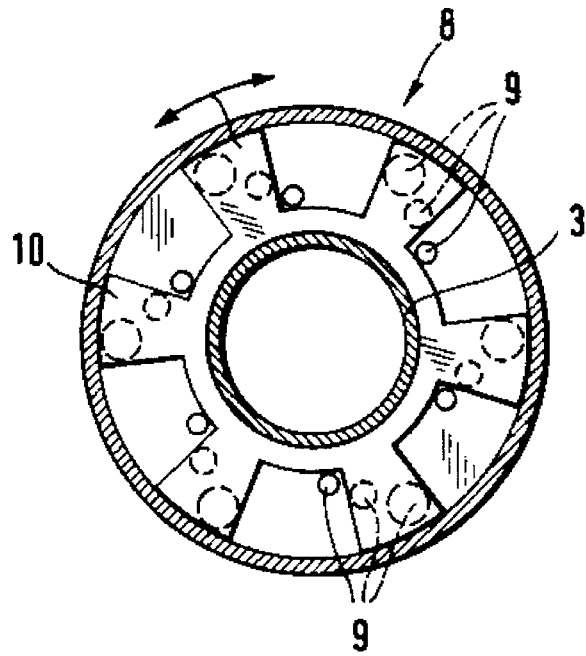
Figure 3C:
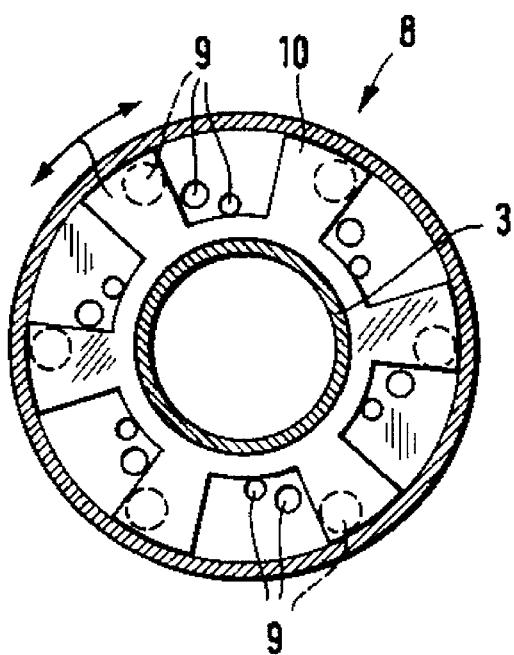

FIGS. 3B–3C illustrate how the gas distribution tubes 9 are advantageously grouped, first of all so that by turning the adjusting member they can be covered either wholly or partly, or all tubes can be left open, i.e. the tubes are also grouped in sector-like areas. In addition to this, the tubes are advantageously grouped so that if they are of different sizes, those that are smaller in diameter encircle the distribution channel 3, and the larger tubes are respectively arranged in an outer circle.

In the situation of FIG. 3B, in the 6×3 group of tubes only the smallest tubes adjacent to the distribution channel 3 are left open. This situation is applied mainly to small capacities; the arrangement ensures sufficient discharge velocities for the reaction gases even in this case.

FIG. 3C shows an adjustment where the adjusting member 10 is turned to cover the largest and outmost reaction gas tubes, but the two smallest tube sizes are left open. This adjustment C is meant mainly for running with a normal capacity.

Figure 3D:
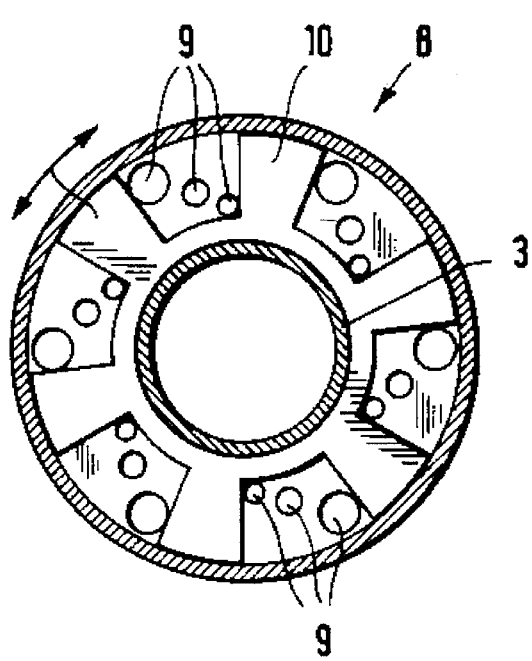

FIG. 3D illustrates an adjustment where all reaction gas tubes are open, and thus suitable and correct velocities are obtained for the gas even with maximum capacity.

The adjustment of FIGS. 2 and 3 is mainly meant for small reaction gas/concentrate ratios, where the total cross-sectional area of the reaction gas tubes is small, and it leaves room for the "blind" areas of the adjusting member.

Figure 4:
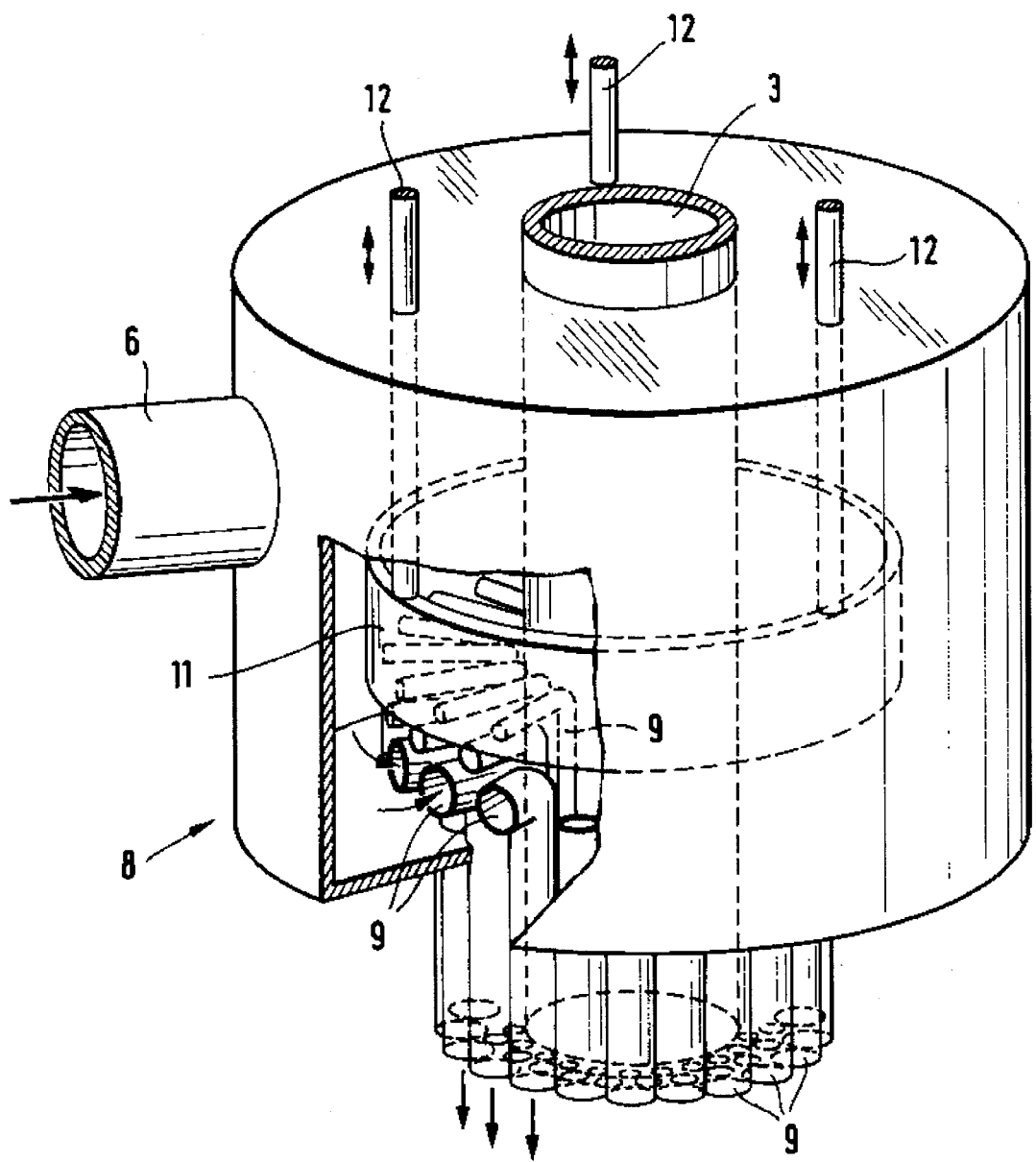
FIG. 4 illustrates another adjusting member arrangement of the invention, encircling the concentrate flow, FIG. 5 includes elevation views of seven different vertically movable adjusting ring alternatives of the adjusting member of FIG. 4.

The adjusting assembly of FIG. 4 is required when, with a maximum capacity of the reaction gas, the cross-sectional area of the tubes becomes so large that the free closed structure left in between the tubes is not sufficient for turning the horizontal adjusting plate to different positions. According to FIG. 4, the tubes 9 are turned to horizontal position at the top part, and simultaneously the burner chamber 8 is enlarged. In this case the adjusting member is an annular and cylindrical-plate 11, which is located at the outer edge of the combustion chamber, and is raised and lowered in order to close the tube ends in a desired fashion, so that the reaction gas is prevented from entering the tubes in question. The adjusting ring 11 can be moved vertically for instance by means of lifting pins 12.

FIG. 5 shows developed views of seven different forms of the adjusting ring 11 of FIG. 4. In FIG. 5A the adjusting member is a regular cylinder, and FIGS. 5B–5F represent cylinders of different forms, where for instance the top edge is shaped to be irregular. FIG. 5G illustrates a two-part arrangement, where part of the cylinder can be lifted while the rest of the adjusting member remains in place.

The adjusting rings 11 can be used for covering the row of tubes completely or partially. The resistance of a partially covered tube grows, and thus reduces the reaction gas flow directed thereto. By making use of the form of the adjusting rings, the symmetry of the pattern created by the reaction gas jets can be controlled. Thus the reaction gas can be directed more or less towards a certain side, so that the tubes on the side in question are left open or closed in respective fashion.

FIG. 6 shows top views of eight different adjusting situations. Cases A . . . D and G deal with only one gas, the reaction gas. In cases E, F and H, there are used two gases, i.e. a reaction gas such as oxygen, and a gaseous extra fuel such as natural gas. A completely black spot represents a closed tube 13, a completely white spot represents for instance a reaction gas tube 14, and a spot with diagonal striping represents an extra gas tube 15. It is apparent that the number of possible adjustment alternatives is nearly infinite, and that in principle there can be several gases, which must then be taken into account by using more gas supply tubes than is illustrated in FIG. 1.

In the embodiment of FIG. 4, the adjusting is carried out manually, but the adjustment assembly can also be automated within the scope of the invention.

The invention is further described with reference to the examples below.

EXAMPLE 1 (reference example)

In a flash smelting furnace, there are used normal concentrate burner systems, i.e. the above mentioned directional burner, central jet distributor and an oxygen lance installed in the middle of the distributor. The concentrate is sulfidic copper concentrate, amount 50 t/h, with a sand addition of about 10%. The employed reaction gas is 98% oxygen, of which amount 5–15% is fed through the oxygen lance, and the rest through a normal directional burner. When measured accordingly, the diameter of the water-cooled outer casing of the central jet distributor will be roughly 500 mm. This means that in order to achieve a sensible velocity (kinetic energy), the width of the annular aperture provided at the discharge orifice of the directional burner will be in the region of 20 mm. For anyone skilled in the art it is apparent that the size of the aperture is fairly small, considering the conditions. First of all, the temperature in the reaction shaft is 1,400°–1,500° C., wherefore changes easily occur in the discharge orifice of the burner, and an aperture of 20 mm does not offer much extra space change without making the flow asymmetric. It is also pointed out that the diameter of the annular aperture is in the region of half a meter, which makes the situation even worse.

If a 95% oxygen-enrichment cannot for some reason be used, but it must be replaced by air, this means that first of all the reaction gas amount is increased to be five-fold. Considering that the air must be preheated at least up to 200° C., the discharge velocity of the reaction gas into the shaft will be at least eight-fold with the same capacity. This velocity is too high in many respects, and there is no other way but to drop the capacity in order to reach a sensible area of operation.

EXAMPLE 2

In the burner system of example 1, there is added the adjusting assembly of the present invention, and the same running situations are calculated anew. It is observed that first of all, speculation of the width of the annular aperture can be forgotten. This alone remarkably reduces the asymmetry. Considering that the diameter of the area composed by the distribution tubes of the present invention can be freely chosen, the area corresponding to the original annular aperture can be made even larger, and the discharge velocity into the furnace can be controlled by means of an on/off adjustment of the tubes. Thus different capacity areas and oxygen-enrichment areas can be taken into account already when designing the measures of the burner. A particularly important feature of the present invention is that the adjustment of the velocity is extended as far as the reaction space itself, and consequently as far as the point of mixture of the concentrate and reaction gas.

We claim:

1. A method for feeding varying volumes of a reaction gas through a concentrate burner and discharging the reaction gas into a reaction shaft of a flash smelting furnace while feeding pulverous material to the furnace through a distribution channel located in the middle of the burner, comprising feeding the reaction gas into the reaction shaft through a plurality of tubular channels arranged around the distribution channel to provide a total cross-sectional area for the flow of reaction gas, discharging the gas from the tubular channels as several separate gas jets, and adjusting discharge velocity of the separate gas jets by adjusting the total cross-sectional area for the flow of reaction gas by selectively closing channels of said plurality of tubular channels to accommodate variations of the volume of reaction gas fed to the reaction shaft of the furnace.

2. The method of claim 1 wherein the separate gas jets are symmetrically arranged around the pulverous material channel.

3. The method of claim 1 and including feeding gaseous extra fuel in addition to the reaction gas into the reaction shaft through the tubular channels and burning the gaseous extra fuel in the reaction shaft.

4. The method of claim 1 comprising adjusting the discharge velocity of the separate gas jets in accordance with the quantity of pulverous material fed to the furnace.

5. The method of claim 1 wherein the reaction gas is oxygen enriched air and comprising adjusting the discharge velocity of the separate gas jets in accordance with the degree of oxygen enrichment of the reaction gas.

6. The method of claim 1 and including also adjusting the velocity of gas jets in accordance with the quantity of pulverous material fed to the furnace.

\* \* \* \* \*